Figure 1:
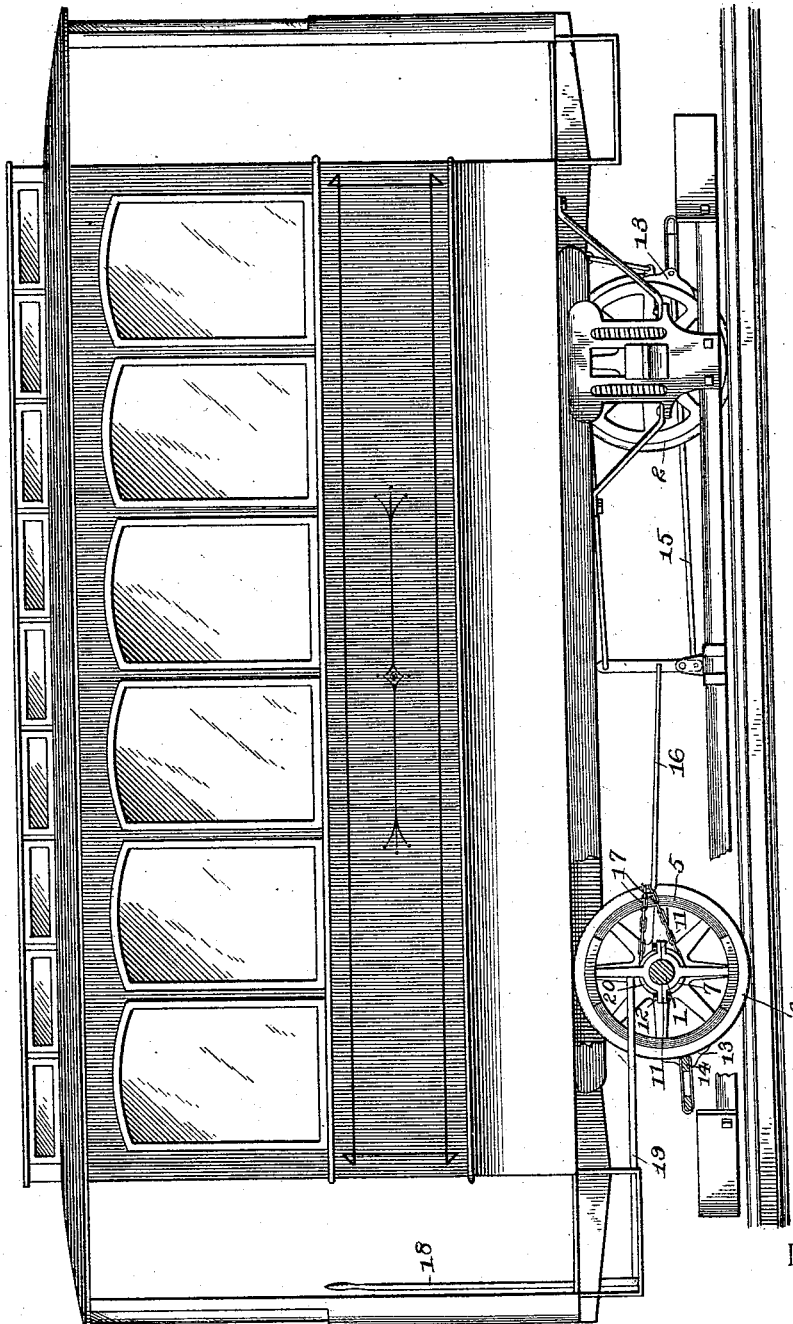

(No Model.) 2 Sheets—Sheet 1.

D. L. WINTERS.
BRAKE FOR RAILWAY CARS.

No. 532,621. Patented Jan. 15, 1895.

Witnesses
C. A. Ford.

By his Attorneys.

Inventor
David L. Winters.
C. A. Snow & Co.

(No Model.)  2 Sheets—Sheet 2.
D. L. WINTERS.
BRAKE FOR RAILWAY CARS.
No. 532,621. Patented Jan. 15, 1895.
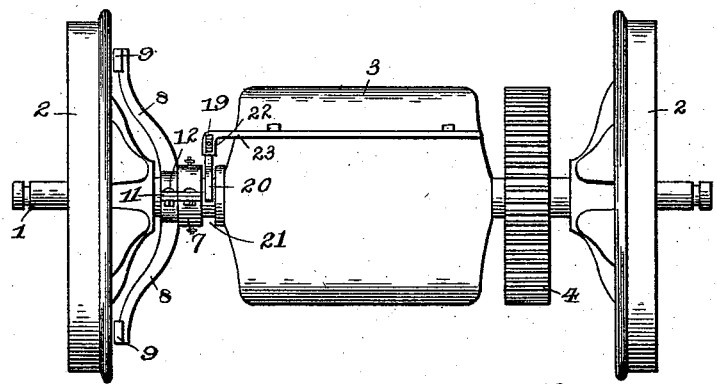
Fig. 2.
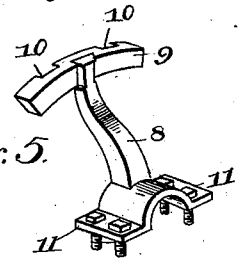
Fig. 5.
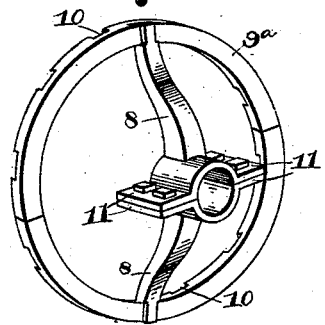
Fig. 7.
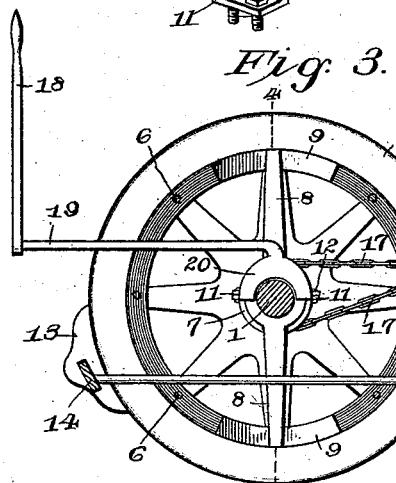
Fig. 3.
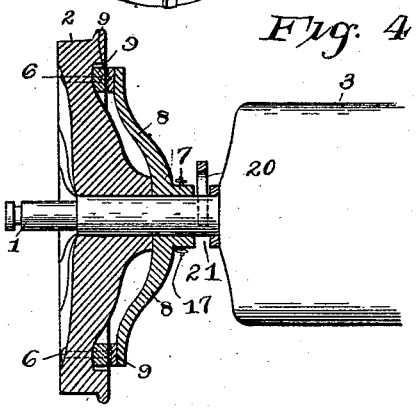
Fig. 4.
Fig. 6.
Witnesses
C. A. Ford
Inventor
David L. Winters,
By his Attorneys.
C. A. Snow & Co.

UNITED STATES PATENT OFFICE.

DAVID L. WINTERS, OF PUEBLO, COLORADO.

BRAKE FOR RAILWAY-CARS.

SPECIFICATION forming part of Letters Patent No. 532,621, dated January 15, 1895.

Application filed May 19, 1894. Serial No. 511,849. (No model.)

*To all whom it may concern:*

Be it known that I, DAVID L. WINTERS, a citizen of the United States, residing at Pueblo, in the county of Pueblo and State of Colorado, have invented a new and useful Brake-Clutch, of which the following is a specification.

My invention relates to brake-operating mechanisms, and particularly to a friction-clutch and operating mechanism for use in connection with electrically propelled cars, wherein the motor is arranged upon the axle between the wheels, and the brake mechanism must be disposed in a contracted space between one end of the motor and the adjacent wheel; and it has for its object to provide a compact, simple, and efficient mechanism which may be operated by means of a lever from the platform of the car.

Further objects and advantages of the invention will appear in the following description, and the novel features thereof will be particularly pointed out in the appended claim.

In the drawings—Figure 1 is a side view, partly broken away, of a car provided with a brake and operating mechanism embodying my invention. Fig. 2 is a front view of the clutch, showing the same applied in the operative position to an axle and indicating in diagram the casing of a motor. Fig. 3 is a side view of the clutch and connections. Fig. 4 is a sectional view on the line 4—4 of Fig. 3. Fig. 5 is a detail view of one arm of the clutch. Fig. 6 is a detail view of the clutch-shoe. Fig. 7 is a detail view showing a slightly modified form of clutch-shoe.

Similar numerals of reference indicate corresponding parts in all the figures of the drawings.

1 designates an axle bearing the wheels 2, and secured to the axle between the planes of the wheels is the motor-casing 3, and adjacent to one end thereof the gears 4, all of the ordinary or any preferred construction. Secured to the inner side of one of the wheels is an annular friction plate 5, which may be secured to the wheel by means of bolts 6 or similar devices, and loosely mounted upon the axle adjacent to the plane of the said wheel is a drum 7 to which are secured the radial clutch-arms 8, provided at their outer extremities with clutch-shoes 9 for frictional contact with the said annular plate. These clutch-shoes are provided in their faces with openings or notches 10 to allow sand and grit of any kind to escape as the clutch-shoes are brought into contact with the friction-plate. The clutch-arms are provided at their inner ends with lateral ears 11, perforated for the reception of the securing bolts 12 to facilitate the attachment of said arms to the shaft of the axle.

13 represents brake-shoes, which are connected by a brake-bar 14, and to the center of the brake-bar is connected one end of a connecting-rod 15, all of the ordinary construction, and 16 represents a brake-rod, also of the ordinary construction, which serves as the means of communicating motion to the brake-levers, not shown. To the extremity of this brake-rod are connected the ends of the brake-chains 17, the outer ends of said chains being secured to opposite sides of the drum, whereby said drum will wind one of the chains and thus operate the brake-rod irrespective of the direction of rotation of the wheel.

The means for bringing the clutch-arms into operative relation with the friction-plate carried by the wheel may be varied according to the construction of the car upon which the device is used, but in the construction illustrated, said means consist of a hand-lever 18, which is adapted to be arranged on the platform or dash of the car within reach of the motor-man, a rock-shaft 19 to which said hand-lever is connected, and a yoke 20 which engages a groove 21 at one end of the drum or upon a sleeve formed integrally therewith. Said rock-shaft is mounted in a keeper 22 supported by a bracket 23 projecting laterally from the motor-casing.

From the above description it will be understood that in order to apply the brake the hand-lever is operated to turn the rock-shaft, and thus move the clutch-arms into position to bring the clutch-shoes into contact with the friction-plate, whereupon the motion of the wheel is communicated to the clutch-arms, and by the latter to the drum, and one of the friction-chains is reeled upon the drum, thus operating the brake-rod.

The friction-plate is employed to prevent frictional contact with the wheel proper, and thus avoid wearing the latter, but it will be understood that the clutch-shoes may be used directly in contact with the surface of the wheel, thus dispensing with the friction-plate.

Various changes in the form, proportion, and the minor details of construction may be resorted to without departing from the spirit of the invention or sacrificing any of the advantages thereof.

It will be understood from the foregoing description that the improved brake-clutch may be operated from either or both platforms of the car, and that as shown in Fig. 7, the clutch-shoe 9ª may be made continuous and consist of a ring for frictional engagement with the annular friction-plate which is attached to the car-wheel.

Having described my invention, what I claim is—

The combination with a brake-rod and connections, of a drum, flexible connections between the drum and the brake-rod, an annular friction-plate removably secured to and carried by a wheel, clutch-arms secured to the drum and provided with clutch-shoes to engage the friction-plate, and means for operating the clutch-arms to bring their shoes into frictional contact with said friction plate, substantially as specified.

In testimony that I claim the foregoing as my own I have hereto affixed my signature in the presence of two witnesses.

DAVID L. WINTERS.

Witnesses:
LEOTA WILLITS,
JOHN T. HIGGINS.